US 6,742,821 B2

(12) United States Patent
Kleinpell

(10) Patent No.: US 6,742,821 B2
(45) Date of Patent: Jun. 1, 2004

(54) FOOD SCOOP

(76) Inventor: Arthur Kleinpell, 457 N. Cranbrook Rd., Bloomfield Hills, MI (US) 48301

(*) Notice: Subject to any disclaimer, the term of this patent is extended or adjusted under 35 U.S.C. 154(b) by 0 days.

(21) Appl. No.: 09/794,451

(22) Filed: Feb. 27, 2001

(65) Prior Publication Data

US 2002/0117871 A1 Aug. 29, 2002

(51) Int. Cl.$^7$ .............................................. A47F 13/08
(52) U.S. Cl. ........................... 294/55; D7/687; 206/457
(58) Field of Search ................................. 294/1.3, 26.5, 294/49, 55, 65.5; 30/324; 206/457; 209/417–419; 220/23.87, 62.11–62.14, 62.18, 495.01, 592.16; 229/400, 402; 428/542.2; D7/514, 516, 519, 534, 654–661, 689, 691, 692; D8/10; D30/161, 162

(56) References Cited

U.S. PATENT DOCUMENTS

| 926,927 | A | * | 7/1909 | Devol ........................ 15/257.2 |
| 2,026,078 | A | * | 12/1935 | Walker ....................... 294/55 X |
| 2,895,636 | A | * | 7/1959 | Martin ............... 220/592.16 X |
| 3,018,502 | A | * | 1/1962 | Lossius ....................... 15/257.2 |
| 3,602,386 | A | * | 8/1971 | Brime ............... 220/495.01 K |
| 3,968,591 | A | * | 7/1976 | Pearson, Jr. ................... 30/324 |
| D249,321 | S | * | 9/1978 | Mancini ........................ D7/654 |
| 4,201,795 | A | | 5/1980 | Yamanaka ................... 426/110 |
| 4,593,817 | A | | 6/1986 | Ferrero ........................ 206/457 |
| 4,835,860 | A | * | 6/1989 | Infeld ............................... 30/2 |
| 4,880,112 | A | | 11/1989 | Conrad ........................ 206/216 |
| D315,444 | S | | 3/1991 | Maddocks ..................... D3/66 |
| D319,374 | S | * | 8/1991 | Johannsen .................... D7/689 |
| 5,188,409 | A | * | 2/1993 | Forey ......................... 294/19.2 |
| 5,379,911 | A | | 1/1995 | Goto et al. .................. 220/339 |
| 5,503,442 | A | * | 4/1996 | Lee .............................. 294/1.4 |
| 5,511,685 | A | * | 4/1996 | Nelson .................... D7/514 X |
| 5,614,275 | A | * | 3/1997 | Chan ....................... D7/516 X |
| D387,957 | S | * | 12/1997 | Keller et al. ................. D7/691 |
| D418,028 | S | * | 12/1999 | Allison ........................ D7/689 |
| 6,073,798 | A | * | 6/2000 | Rosenhain .............. 206/457 X |
| D431,966 | S | * | 10/2000 | De Pascale ................... D7/516 |
| 6,126,217 | A | * | 10/2000 | Guadiana et al. ............. 294/24 |
| 6,250,696 | B1 | * | 6/2001 | Baker .................. 248/206.5 X |
| 6,398,065 | B1 | * | 6/2002 | Lewis .................... 206/457 X |
| 6,477,745 | B2 | * | 11/2002 | Strebl ........................ 24/3.12 |

* cited by examiner

Primary Examiner—Dean J. Kramer
(74) Attorney, Agent, or Firm—Gifford, Krass, Groh, Sprinkle, Anderson & Citkowski, PC

(57) ABSTRACT

A scoop for scooping pet food includes a scooping portion with an inner surface, an outer surface, and a lip interconnecting the inner and outer surfaces. The inner surface is concave and smooth, while the outer surface is spaced from the inner surface and forms a three-dimensional representation of a non-cup-shaped object. The lip is disposed generally in a plane. The handle portion extends from the scooping portion and is generally coplanar with the lip of the scooping portion.

24 Claims, 3 Drawing Sheets

FOOD SCOOP

FIELD OF THE INVENTION

The present invention relates generally to food handling utensils and, more specifically, to a scoop with decorative features.

BACKGROUND OF THE INVENTION

Scoops of various types are often used to transfer substances such as pet food from one container to another. One function of such a scoop is to facilitate the transfer of food and avoid contamination of the user's hands or other utensils. For example, it is easier, quicker, and cleaner to use a scoop to transfer pet food from a bag of food to the pet's feeding bowl than it is to attempt to pour the food, use one's hand or other approaches. A second function of some food scoops is to measure a particular quantity of food. Measuring cups are probably the most familiar type of food scoop designed to measure various quantities of food. Many pet owners prefer to measure the quantity of food dispensed to a pet for dietary and health management purposes. Pets, especially dogs, will typically consume more food than is required for maintenance of a healthy body weight if extra food is available to them. Therefore, pet owners may measure specific quantities of food on a daily basis so as to provide sufficient nutrition for the pet without allowing the pet to overeat. Measuring food quantity also allows a pet owner to monitor whether the pet's eating habits change over time. For example, if the owner notices that food from the previous day remains, this may indicate a reduction in appetite and the owner may wish to investigate the cause.

Food scoops that meet the above two requirements are available, including the above mentioned measuring cups. Desirable characteristics in these food scoops include ease of use, easy cleanability, and the ability to measure out predetermined portion sizes. In order to meet the easy cleanability requirement, it is desirable that the interior surface of the scoop be smooth, without any nooks and crannies or overhangs to catch food. In order to provide the ability to measure predetermined quantities, it is desirable that the scoop have a recognizable cup-shaped interior. Many users can identify the approximate size of the interior of various sizes of measuring cups without resorting to reading notations on the measuring cup itself. Therefore, it is desirable that a food scoop have an interior shape similar to a measuring cup so as to allow easy visual approximation of the interior size of the scoop.

A shortcoming of presently available food scoops is the lack of aesthetic appearance. Most scoops have a very plain, utilitarian look and are therefore typically kept in a drawer or other area where they are out of sight. With pet food scoops, it may be desirable to keep the food scoop in an area where it is in plain view to allow it to be easily located and reused. Also, pet food scoops are often not washed between uses, and therefore it is not desirable to put them inside of an area where food residue may contact other objects.

One approach to providing a pleasing aesthetic appearance would be to provide the exterior surface of the scoop with a complex three-dimensional shape so that the exterior surface may have the appearance of an object other than a food scoop. Large and small food molds are known that have a concave interior surface and a convex exterior surface. These may have a three-dimensional shape such that the mold has a pleasing appearance when viewed from the exterior surface. Such food molds are typically formed from a thin sheet of material, such as copper, and have a complimentary interior and exterior shape. The molds may be used to mold gelatin, small cakes, or other food items to the shape of the concave interior surface. Some owners of food molds display the food molds in a kitchen with the exterior surface visible, due to their pleasing aesthetic appearance. However, these food molds do not work well as a food scoop for several reasons. First, the three-dimensionally complex interior surface is significantly more difficult to clean than a cup-shaped interior. Also, because the interior of the mold does not have a recognizable cup-shape, similar to a measuring cup, it is difficult or impossible to visually estimate the interior volume of the mold. These food molds also typically lack a handle for manipulating the mold for use as a scoop.

Some companies may wish to distribute a pet food scoop as a novelty or promotional item. For example, a large retailer of pet food may want to provide a free pet food scoop with the purchase of pet food. The promotional food scoop then serves as a reminder of where the consumer purchased the food. For this application, it is desirable that the scoop be aesthetically pleasing, so that the user retains it for an extended period. It is also desirable that the scoop include indicia related to the promotion. For example, the scoop may bear the name of the retailer or a slogan associated with the retailer. From a manufacturing standpoint, it is desirable that such a food scoop have portions that may be easily printed upon so that one scoop design may be printed with indicia related to more than one distributor of the scoops. It is also desirable that the scoop be easily cleanable and have a recognizable volume.

In light of the above, there remains a need for a food scoop with an easily cleanable cup-shaped interior surface and a three-dimensionally complex exterior surface so as to provide an aesthetically pleasing exterior appearance.

SUMMARY OF THE INVENTION

The present invention provides an improved scoop that overcomes several of the shortcomings of the prior art. The scoop is primarily designed for scooping pet food and includes a scooping portion with an inner surface, an outer surface, and a lip interconnecting the inner and outer surfaces. The inner surface is concave and smooth, while the outer surface is spaced from the inner surface and forms a three-dimensional representation of a non-cup-shaped object. The lip interconnecting the inner and outer surfaces lies generally in a plane. A handle portion extends from the scooping portion and lies generally in the same plane as the lip of the scooping portion.

DETAILED DESCRIPTION OF THE PREFERRED EMBODIMENTS

Figure 1:
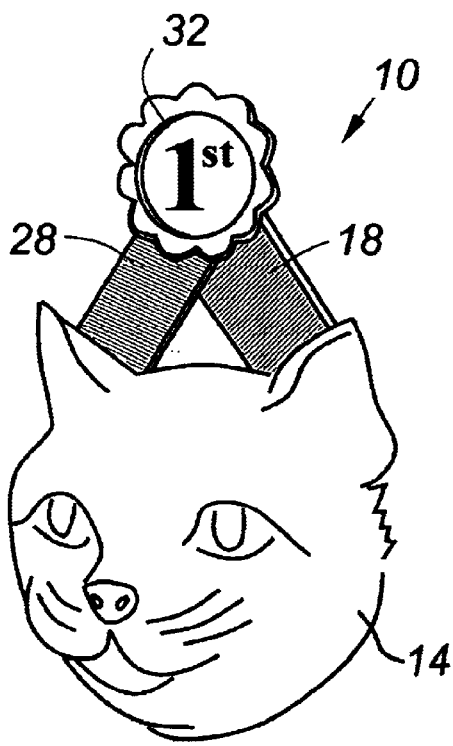
FIG. 1 is a front elevational view of a first embodiment of a pet food scoop according to the present invention, showing the exterior surface thereof.
Figure 2:
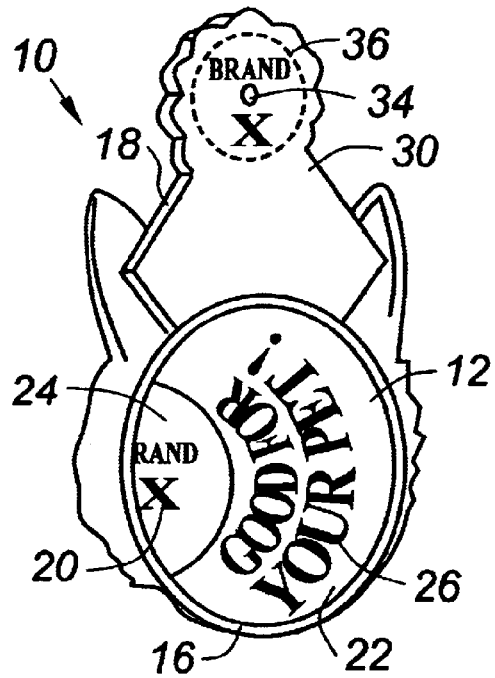
FIG. 2 is a rear perspective view of the scoop of FIG. 1, showing the concave inner scooping surface and various indicia on printable surfaces of the scoop.
Figure 3:
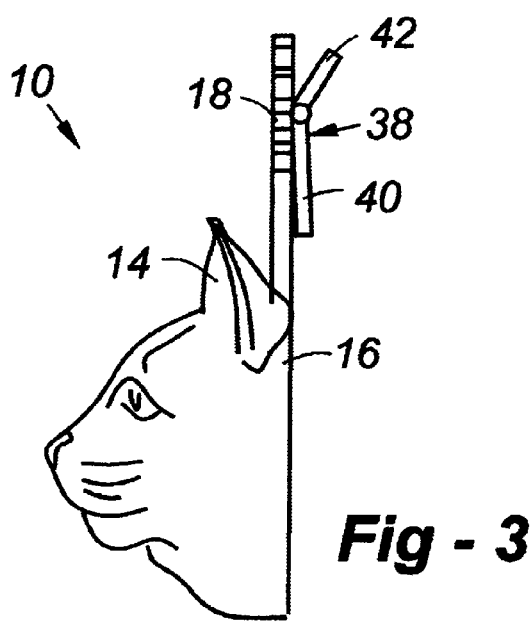
FIG. 3 is a side elevational view of the scoop of FIGS. 1 and 2.

Referring to FIGS. 1–3, a first embodiment of a pet food scoop according to the present invention is generally shown at 10. As shown, the scoop 10 has an inner scooping surface 12, an exterior decorative surface 14, and a lip 16 interconnecting the inner and outer surfaces. A handle 18 extends from the joined inner and outer surfaces and allows manipulation of the scoop 10. The inner surface 12 is preferably cup-shaped, as shown, so as to have the familiar inner shape of a measuring cup. It may also include volume markings. In the illustrated embodiment, the inner surface 12 has a flat bottom with a smoothly tapering sidewall 22 extending from the bottom 20. Preferably, the bottom wall 20 and sidewall 22 are formed of a smooth plastic suitable frame having indicia, such as 24 and 26 printed thereon. By printing the indicia directly onto the surfaces, the surfaces remain smooth. Also, the scoop may be produced in an unprinted version and then later printed with indicia suitable for a purchaser. The indicia may be printed in any of a variety of ways, including adhesively attached to indicia, as will be clear to those of skill in the art. The indicia may also be formed into the inner surface 12 during the molding process, if so desired. Throughout this application, directions or positions such as up, bottom, and front are used. These terms are for ease of description only and are not limiting. The embodiments of the present invention may be reoriented, thus altering the positions and directions, without departing from the scope of the invention.

The exterior surface 14 may be said to have a complex, 3-dimensional shape that is representative of an object. It is not cup-shaped. In the embodiment illustrated in. FIGS. 1–3, the object represented by the shaped exterior surface is the head of a cat. It is shaped to include ears, eyes, a nose, a mouth, and the general overall shape of the head of a real cat. It is preferably painted or colored so as to give a more realistic appearance. As shown, the lip 16 lies generally in a plane and the handle 18 extends generally from the lip and also lies generally in the plane. The handle 18 has a front surface 28 and rear surface 30, one or both which may be suitable for printing indicia thereon. In the illustrated embodiment, the front surface 28 is molded to have the appearance of a ribbon with tails of the ribbon interconnected with the head of the cat. The upper end of the handle 18 has a generally circular portion that forms the face 32 of the ribbon. This face 32 is preferably a smooth plastic for printing with an indicia. Alternatively, this too may be molded with a shape or indicia. The rear surface 30 may also be printed with an indicia, as shown, and is preferably a smooth plastic for this purpose.

Preferably, the scoop 10 may be hung on a surface such that the decorative outer surface 14 is visible to a user. For example, the user may wish to hang the scoop on a surface near the pet's food and bowl for easy access. The aesthetic appearance of the outer surface 14 makes the scoop highly identifiable and pleasing to look at. In order to hang a scoop on a surface, the back surface 30 of the handle 18 may have a hole 34 defined therein for passing over a hook or nail.

Alternatively, or in addition thereto, a magnet 36 may be embedded in the handle 18 or positioned on the rear surface 30 so that the scoop may be magnetically positioned on a metal surface, such as a refrigerator, a washing machine, or other appliances. A magnet may also be provided in the handle of a simpler scoop. As yet another alternative, a clip member 38 may be provided on the handle 18, as shown in FIG. 3. The clip 38 allows the scoop 10 to be clipped to a variety of objects, such as the top of a dry bag of food. As known to those of skill in the art, the clip member 38 may be of various designs. In the illustrated embodiment there is a gripping jaw 40 and a lever 42 for opening the jaw 40. The operator squeezes the lever on 42 to open the jaw 40, passes the jaw over one side of the object to be clipped and releases the handle 42. This design may be used to help keep the pet's food bag closed between feedings. An alternative, simpler embodiment of the scoop includes a clip and any design of scoop. Also, the clip may have two jaws, rather than cooperating with the handle to grip an item.

As will be clear to those of skill in the art, the inner surface 12 and the outer surface 14 of the scoop 10 have distinctly different shapes, and therefore are spaced from one another. This may be accomplished in a variety of ways. One preferred approach is to provide a 2-pieced scoop 50, as shown in FIG. 4. The scoop 50 has an outer member 52 and an inner member 54 that nest together to form the scoop. The outer member 52 has the complex shape required to provide a three-dimensional outer surface 56 representative of an object. The outer member 52 has an inner surface 58 that generally follows the profile of the outer surface 56. As known to those of skill in the molding arts, it is preferred that the wall thickness of the outer member be similar in all areas. Therefore, the inner surface 58 of the outer member 52 is neither smooth nor cup-shaped. The outer member 52 also includes a handle element 60. The inner member 54 has a concave portion with an inner surface 62 that is concave, smooth, and cup-shaped. A handle element 64 extends from the concave portion. The inner member 54 is designed to nest into the outer member 52 to form the scoop 50. Once joined, the inner member 54 provides the inner surface while the outer member provides the outer surface, and the handle elements 60 and 64 nest together to form a gripping handle. This construction approach provides several advantages. First, the inner and outer members may be formed of different types of plastics, so that each may be molded with the optimal plastic for the application. For example, one type of plastic may be suitable for the outer member which has a complex shape and is designed to be painted or colored. Another plastic may be more suitable to the inner member which is designed to be smooth, printable, and easily cleanable. Also, this approach may use less plastic. An additional advantage to this design is that the volume of the concave inner surface 62 may be altered depending on the application. For example, different inner members 54 may be nested with the outer member 52 depending on the desired volume of the measuring scoop. Therefore, some inner members may be provided with a volume in the inner surface of a quarter cup while others are provided with the volume of a half cup. In this way scoops may be offered that are suitable for different sizes of pets, without redesigning the outer member 52. For cleaning purposes, the inner and outer members may be disassembleable. Alternatively, they may be sealed to one another so that water and other cleaning fluids do not get between the two members. As yet another alternative, drain holes may be provided in the outer member 52 so that any liquids which get between the inner and outer members can drain out. The drain holes may be integrated with the appearance of the outer surface, such as by aligning them with the whisker marks.

Figure 4A:
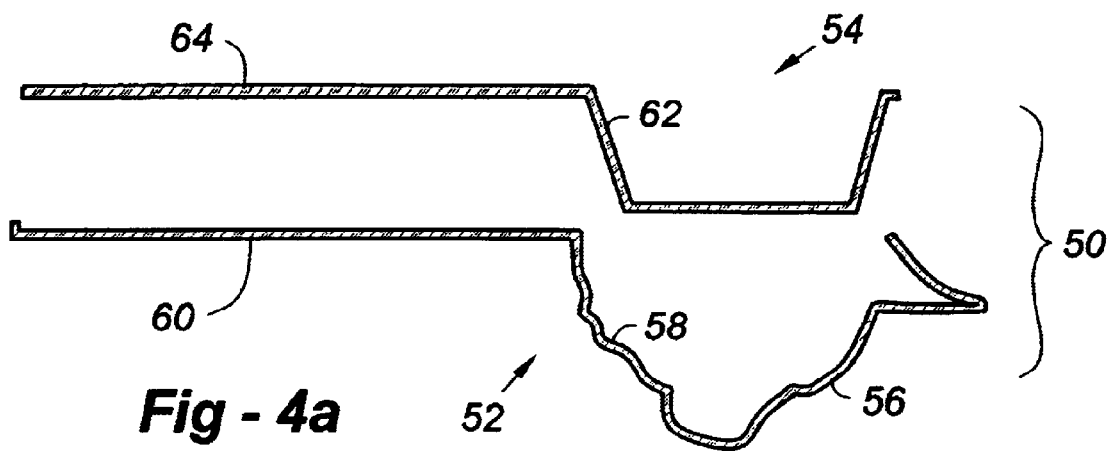
FIG. 4A is an exploded cross-sectional view of the scoop in FIGS. 1–3 showing one preferred construction thereof.
Figure 4B:
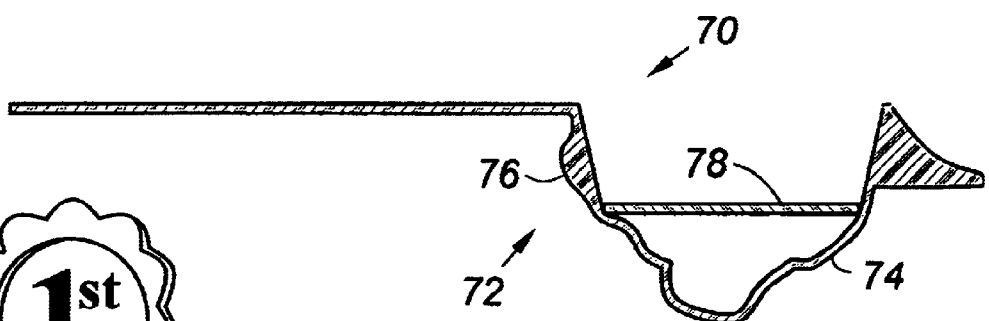
FIG. 4B is a cross-sectional view of an alternative construction approach for a scoop according to the present invention.

Referring now to FIG. 4B, an alternative construction for a scoop according to the present invention is shown. The scoop 70 has an outer member 72 with a complexly shaped three-dimensional outer surface 74 and an inner surface 76. The side portions of the inner surface 76 are smooth, as shown to provide the sides of the inner surface. However, an inner bottom member 78 may be installed so as to cover the bottom portion of the inner surface 76 where the inner surface is more complexly shaped. As an alternative to the construction approaches in FIGS. 4A and 4B, the inner member as shown in FIG. 4A may not include the handle element 64, and instead only the cup-shaped portion that inserts into the outer member.

Figure 5:
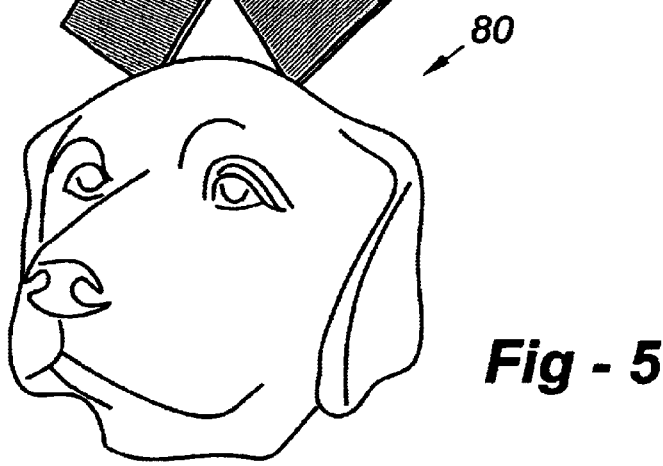
FIG. 5 is a front perspective view of a second embodiment of a food scoop according to the present invention.

The shape and appearance of the exterior surface of a scoop according to the present invention may be of various designs so as to be representative of different objects. For example, in FIG. 5 a scoop 80 with an outer surface representative of the head of a dog is illustrated. Other animals as well as other objects may be represented. However, in each case, the exterior surface may be said to have a 3-dimensional shape that is non-cup-shaped.

Figure 6:
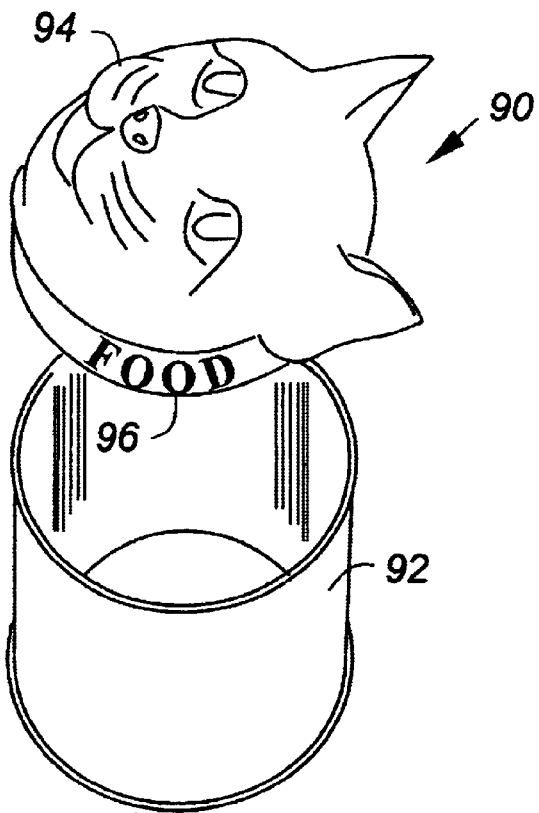
FIG. 6 is a perspective view of a food container lid according to the present invention positioned for mating with a food container.
Figure 7:
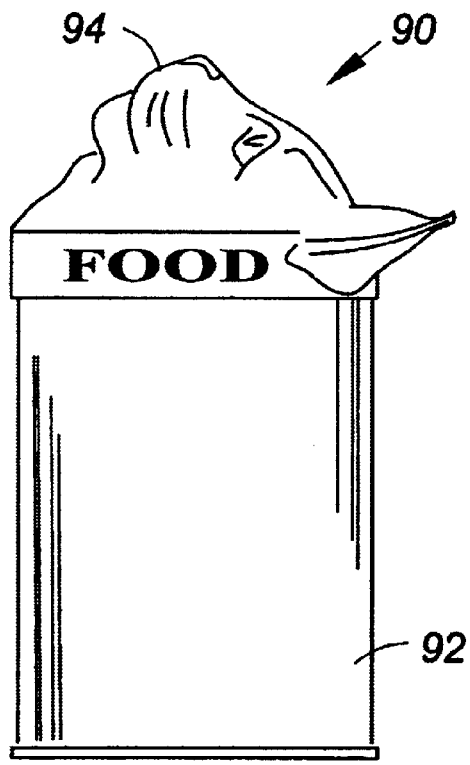
FIG. 7 is a side elevational view of the lid of FIG. 6 positioned on a food container.
Figure 8:
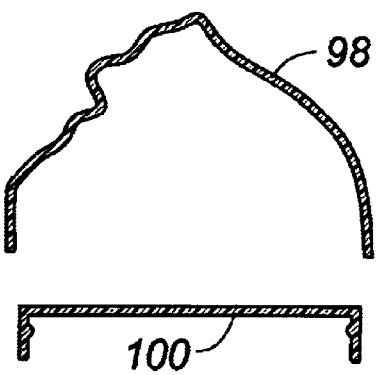
FIG. 8 is an exploded cross-sectional view of the lid of FIGS. 6 and 7 showing one construction thereof.

Referring now to FIGS. 6 and 7, a pet food lid according to the present invention is generally shown at 90, along with a food container 92. The lid 90 has a complex three-dimensional, non-cup-shaped exterior surface 94 that is aesthetically pleasing and representative of an object. A printable surface 96 is preferably provided near the perimeter of the outer surface 94. Though not shown in these figures, the lid 90 has an inner surface which is shaped to grip the top of the food container 92 and to seal it between uses. FIG. 8 shows an exploded cross-sectional view of one construction for the lid. In this case, the lid has an outer member 98 that has a three-dimensional shape in the outer surface and an inner member 100 that is a resilient lip-shaped member designed to grip the top of the food container. The lid may be disassembleable for cleaning purposes, or may be cleaned as is. Also, drain holes may be provided in the outer member 98.

As will be clear to those of skill in the art, the illustrated embodiments of the present invention may be altered in various ways without departing from the scope or teaching of the present invention. It is the following claims, including all equivalents, which define the scope of the invention.

I claim:

1. A scoop for scooping pet food comprising:
  a scooping portion having an inner surface, an outer surface, and a lip interconnecting the inner and outer surfaces, the lip being disposed generally in a plane, the inner surface being concave and smooth and facing the plane, the inner surface having a flat bottom wall, the outer surface spaced from the inner surface and forming a three dimensional representation of a non-cup-shaped object facing generally perpendicularly away from the plane, the outer surface not having a flat portion such that the outer surface is not configured to rest stably on a flat support surface; and
  a handle portion extending from the scooping portion and being generally coplanar with the lip of the scooping portion.

2. The scoop according to claim 1, further comprising an inner member forming the inner surface and an outer member forming the outer surface, the inner and outer members being interconnected to form the scoop.

3. The scoop according to claim 1, wherein the inner surface has no undercuts.

4. The scoop according to claim 1, wherein the inner surface is suitable for printing thereon.

5. The scoop according to claim 1, wherein the lip is ring-shaped.

6. The scoop according to claim 1, wherein the outer surface forms a three dimensional representation of the head of an animal.

7. The scoop according to claim 1, wherein the handle portion includes a magnet for attaching the scoop to a metallic surface.

8. The scoop according to claim 1, further comprising a clip member interconnected with the handle portion, the clip member cooperating with the handle portion to selectively grip an item.

9. A scoop for scooping pet food comprising:
  a scooping portion having an inner surface, an outer surface, and a lip interconnecting the inner and outer surfaces, the lip being disposed generally in a plane, the inner surface being concave and smooth and facing the plane, the inner surface being cup-shaped with a flat bottom wall and a smooth side wall tapering outwardly and upwardly from the bottom wall, the outer surface spaced from the inner surface and forming a three dimensional representation of a non-cup-shaped object facing generally perpendicularly away from the plane, the outer surface not having a flat portion such that the outer surface is not configured to rest stably on a flat support surface; and
  a handle portion extending from the scooping portion and being generally coplanar with the lip of the scooping portion.

10. A scoop for scooping pet food comprising:
  an inner scooping member having a concave, cup-shaped inner surface without any undercuts, the inner surface having a flat bottom wall and a smooth side wall tapering outwardly and upwardly from the bottom wall;
  an outer member having an outer surface with a three dimensional shape representative of a non-cup-shaped object;
  the inner and outer members joined together at a lip such that the inner scooping member is disposed at least partially within the outer member, the lip being disposed generally in a plane with the inner surface facing the plane and the representative shape of the outer surface facing generally perpendicularly away from the plane; and
  a handle portion extending from the inner or outer member for manipulating the scoop, the handle portion including a magnet for attaching the scoop to a metallic surface.

11. The scoop according to claim 10, wherein the inner surface is suitable for printing thereon.

12. The scoop according to claim 10, wherein the lip is ring-shaped.

13. The scoop according to claim 10, wherein the outer surface forms a three dimensional representation of the head of an animal.

14. A scoop for scooping pet food comprising:
  an inner scooping member having a concave, cup-shaped inner surface without any undercuts, the inner surface having a flat bottom wall and a smooth side wall tapering outwardly and upwardly from the bottom wall;
  an outer member having an outer surface with a three dimensional shape representative of a non-cup-shaped object;
  the inner and outer members joined together at a lip such that the inner scooping member is disposed at least partially within the outer member, the lip being disposed generally in a plane with the inner surface facing the plane and the representative shape of the outer surface facing generally perpendicularly away from the plane;

a handle portion extending from the inner or outer member for manipulating the scoop; and a clip member interconnected with the handle portion, the clip member cooperating with the handle portion to selectively grip an item.

15. The scoop according to claim 14, wherein the inner surface is suitable for printing thereon.

16. The scoop according to claim 14, wherein the lip is ring-shaped.

17. The scoop according to claim 14, wherein the outer surface forms a three dimensional representation of the head of an animal.

18. A scoop for scooping pet food comprising:

a scooping portion having an inner member and an outer member, the inner and outer members joined together such that the inner scooping member is disposed at least partially within the outer member with a space between the inner and outer members;

the joined inner and outer members defining a inner surface and an outer surface with a lip interconnecting the inner and outer surfaces, the lip being disposed generally in a plane, the inner surface being concave with a generally flat bottom wall, the inner surface facing the plane, the outer surface forming a three dimensional representation of a non-cup-shaped object facing generally perpendicularly away from the plane, the outer surface not having a flat portion such that the outer surface is not configured to rest stably on a flat support surface; and a handle portion extending from the joined inner and outer members.

19. The scoop according to claim 18, wherein the inner surface has a smooth sidewall tapering outwardly and upwardly from the bottom wall.

20. The scoop according to claim 18, wherein the inner surface is suitable for printing thereon.

21. The scoop according to claim 18, wherein the lip is ring-shaped.

22. The scoop according to claim 18, wherein the outer surface forms a three-dimensional representation of the head of an animal.

23. The scoop according to claim 18, wherein the handle portion includes a magnet for attaching the scoop to a metallic surface.

24. The scoop according to claim 18, further comprising a clip member interconnected with a handle portion, the clip member cooperating with the handle portion to selectively grip an item.

* * * * *